United States Patent
May

(10) Patent No.: US 8,061,661 B2
(45) Date of Patent: Nov. 22, 2011

(54) SYSTEM AND METHOD FOR REDUCING AIRFOIL VORTICES

(75) Inventor: Peter May, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 696 days.

(21) Appl. No.: 11/817,852

(22) PCT Filed: Apr. 5, 2006

(86) PCT No.: PCT/EP2006/003091
§ 371 (c)(1),
(2), (4) Date: Feb. 4, 2008

(87) PCT Pub. No.: WO2006/111272
PCT Pub. Date: Oct. 26, 2006

(65) Prior Publication Data
US 2008/0116322 A1    May 22, 2008

Related U.S. Application Data

(60) Provisional application No. 60/672,444, filed on Apr. 18, 2005.

(30) Foreign Application Priority Data

Apr. 18, 2005   (DE) .......................... 10 2005 017 825

(51) Int. Cl.
*B64C 23/06*      (2006.01)
(52) U.S. Cl. ................ 244/199.4; 244/199.2; 244/199.3
(58) Field of Classification Search ............... 244/199.4, 244/198, 199.1, 199.2, 199.3, 212, 213, 214, 244/215, 216, 217, 87, 88
See application file for complete search history.

(56) References Cited

U.S. PATENT DOCUMENTS

| 2,178,908 | A | * | 11/1939 | Hudson | 16/367 |
| 2,418,301 | A | * | 4/1947 | Heal | 244/91 |
| 2,643,833 | A | * | 6/1953 | Ambroise | 244/226 |
| 2,846,165 | A | | 8/1958 | Axelson | 244/90 |
| 3,997,132 | A | | 12/1976 | Erwin | |
| 4,017,041 | A | * | 4/1977 | Nelson | 244/198 |
| 4,714,215 | A | | 12/1987 | Jupp et al. | 244/199 |
| 6,042,059 | A | | 3/2000 | Bilanin et al. | 244/199 |
| 6,345,790 | B1 | | 2/2002 | Brix | |
| 2002/0066831 | A1 | | 6/2002 | Ngo et al. | 244/199 |

FOREIGN PATENT DOCUMENTS

| DE | 2149956 | 10/1971 |
| DE | 21 49 956 | 4/1973 |
| DE | 199 26 832 | 1/2001 |
| RU | 2 174 483 | 5/2000 |
| WO | WO 03/000547 | 1/2003 |
| WO | WO 2004/002823 | 1/2004 |

OTHER PUBLICATIONS

German Office Action in corresponding Germany Application No. 10 2005 017 825.1-22 dated Sep. 27, 2006.
PCT International Search Report and Written Opinion dated Sep. 8, 2006 issued in corresponding PCT International Application No. PCT/EP2006/003091.
Russian Notice of Allowance dated Feb. 27, 2010.

\* cited by examiner

*Primary Examiner* — Tien Dinh
*Assistant Examiner* — Michael Kreiner
(74) *Attorney, Agent, or Firm* — Ingrassia Fisher & Lorenz, P.C.

(57) ABSTRACT

A system and a method according to the invention reduce wake turbulence of an aircraft in that a component affixed to the extremity of the wing of an aircraft disturbs the rolling action of the air in the region of the outer wing by periodic hingeing movements.

12 Claims, 3 Drawing Sheets

SYSTEM AND METHOD FOR REDUCING AIRFOIL VORTICES

CROSS REFERENCE TO RELATED APPLICATION

The present application is a 35 U.S.C. §§371 national phase conversion of PCT/EP2006/003091, filed Apr. 5, 2006, which claims priority of German Patent Application No. 10 2005 017 825.1, filed Apr. 18, 2005 and of U.S. Provisional Patent Application No. 60/672,444, filed Apr. 18, 2005, the disclosure of which has been incorporated herein by reference.

FIELD OF THE INVENTION

The invention relates to a system and a method for reducing airfoil vortices, in particular for reducing airfoil vortices that are generated on the wings of an aircraft, which vortices may make a significant contribution to the wake turbulence of the aircraft.

TECHNOLOGICAL BACKGROUND

Wake turbulence occurs when the lift necessary for flying is generated. In a wing which generates lift, the pressure on the underside exceeds the pressure on its top. Consequently, at the ends of the wing, air flows from the underside to the top, as a result of which a strong vortex is generated, namely the so called "airfoil vortex". Furthermore, at the trailing edge of the wing the fluid layers coming from the top and from the underside flow past each other in different directions so that a free shear layer arises, which in the direction of the wing span is connected to the respective airfoil vortex. This free shear layer together with the respective airfoil vortex rolls itself into two individual vortices that may rotate in opposite directions in the manner of small horizontal tornadoes which, depending on the size of the aircraft, at their centres can reach top speeds of up to 360 km/h.

Wake turbulence is evident for the equivalent of several hundred wingspans downstream before it decays. This means that in the case of large aircraft such wake turbulence can have a life of several minutes and a length of up to 30 km.

This could have grave consequences in particular for a small aircraft that flies into wake turbulence; for example severe local fluctuations in aerodynamic forces could lead all the way to loss of a stable flight position.

For this reason, aircraft should have to maintain a corresponding distance to each other, in particular during takeoff and landing. The airfoil vortices generated by the wing, which vortices result from the continuous rolling action, thus endanger aircraft that follow, and are a limiting factor in determining takeoff and landing frequencies.

SUMMARY OF THE INVENTION

Amongst other things, it may be an object of the present invention to create a system and a corresponding method for reducing airfoil vortices that arise from the continuous rolling action, and thus for reducing the wake decay time in the case of aircraft.

This object may be met as set out in the independent claims. Further exemplary embodiments of the invention are stated in the subordinate claims.

The system according to the invention comprises a component at the extremity of a wing of an aircraft, which component, in order to disturb the rolling action of the air in the region of the outer wing, can periodically be hinged on an axis that extends so as to be essentially perpendicular to the direction of flight. This rolling action of the air may result from the airflow that is in contact with the wing and from the resulting difference in pressure between the top of the wing and the underside of the wing.

The system according to the present invention can be integrated in existing components, wherein independent solutions are also imaginable. Alternatively, the system according to the invention can be combined with existing components. In the subsequent descriptions and the enclosed figures of the embodiments, these components are referred to as "winglets" or "wing tip fences". Today, these aerodynamically effective components that are integrated in the extremities of the wings form part of almost all larger commercial aircraft.

According to another exemplary embodiment of the invention the periodically hingeable component is located on the top of the wing and comprises a fixed element and a first and a second hingeable wing element. The first and the second hingeable wing element are for example arranged side-by-side downstream of the fixed element, and can be folded out relative to each other. According to this improvement of the invention, especially the hingeable wing elements in their folded-out positions can periodically be hinged to and fro relative to the axis that extends so as to be essentially perpendicular in relation to the direction of flight, wherein a relative position of the wing elements in relation to each other is constant, or according to one alternative is changed during the hingeing procedure.

According to another embodiment of the invention the component comprises a movable first wing element on the top of the wing and a movable second wing element on the underside of the wing. The first wing element and the second wing element are preferably facing each other in the region of the outer wing.

According to the both embodiments of the invention, as described in the preceding paragraphs above, the wing elements can be controlled into a first position in which the wing elements extend essentially parallel in relation to the direction of flight, and into a second position in which the first wing element is folded outward (away from the fuselage) at a first predetermined deflection angle in relation to the direction of flight, and the second wing element is folded inward (towards the fuselage) at a second predetermined deflection angle to the direction of flight. In this way the coefficient of resistance of the aircraft is increased by a predetermined value (depending on the configuration, while keeping the lift quasi constant). Without readjusting thrust, in this way a steeper descent or dive (glide path) is thus initiated.

For controlled interference with the rolling action of the air in the region of the outer wing, in the second position the wing elements are periodically moved to and fro at a predetermined speed between an outer end position and an inner end position. The speed can for example be constant or it can change.

During the periodic hingeing action the first and the second deflection angle of the wing elements are such that the coefficient of resistance of the airfoil remains constant, as a result of which there is no negative effect on passenger comfort because no changes in thrust occur.

According to the invention, for example in the landing phase, the first and second wing elements may be controlled from a first position in which the wing elements are folded together and in which the first and second deflection angles are zero, to a second position, in which the first wing element at a first predetermined deflection angle is folded outward, and the second wing element at a second predetermined angle relative to the axis that extends in the direction of flight is folded inward. Subsequently, in a second step the wing elements that are folded out in this way can be moved periodically to and fro (in the direction of flight) between a first end position and a second end position, on an axis which is essentially perpendicular in relation to the direction of flight, wherein during the hingeing movement the first and the second deflection angle are controlled such that a coefficient of resistance of the wing remains constant. In this way the airfoil vortices are disturbed, and the wake turbulence of the aircraft is thus reduced.

According to the invention it is thus possible to shorten the so-called disturbance time of an aircraft, which disturbance time is determined by its wake and the decay time of said wake. The term "disturbance time" of an aircraft refers to the minimum waiting time between takeoff and landing of an aircraft until the permitted safe takeoff or landing of a following aircraft. Depending on the intensity and extent or elongation of the wake, different decay times result, according to which an aircraft is then classified into disturbance classes.

According to the invention an increase in capacity of airports can be achieved without additional takeoff and landing runways by reducing the disturbance times of the aircraft among each other by means of the system and the method according to the invention.

SHORT DESCRIPTION OF THE DRAWINGS

Below, exemplary embodiments of the invention are described with reference to enclosed drawings. In the drawings.

Below, the same reference characters are used for identical components in the various views of the figures.

DETAILED DESCRIPTION OF EXEMPLARY EMBODIMENTS

Figure 1:
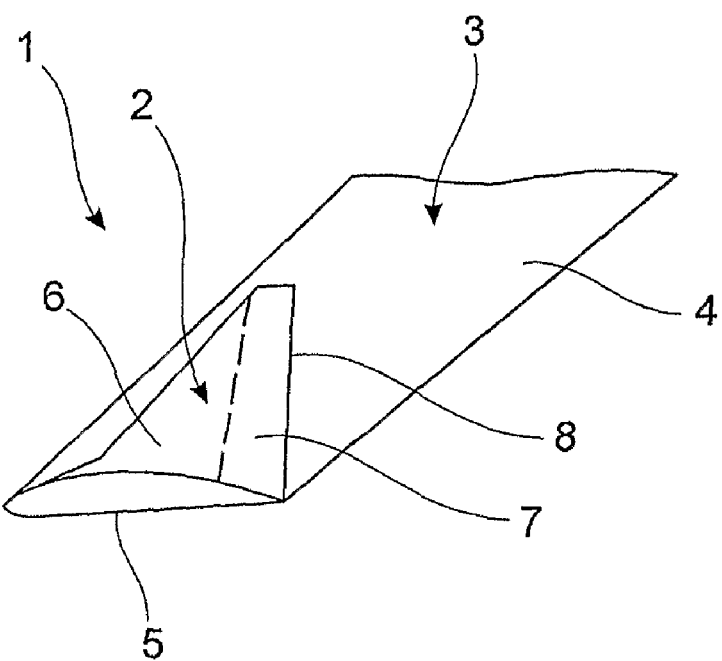
FIG. 1 shows a diagrammatic perspective partial view of an aircraft with a system according to a first embodiment of the invention.

FIG. 1 shows a diagrammatic perspective partial view of a system 1 according to a first embodiment.

System 1 comprises a component 2 which is arranged on the outermost edge region of a wing 3 of an aircraft (not shown).

As shown in FIG. 1, according to the first embodiment of the invention the component 2 is arranged on the top 4 of a wing in order to disturb an airstream that flows from the underside 5 of the wing to the top 4 of the wing (rolling action).

The component 2 according to the first embodiment comprises a fixed element 6, a first wing element 7 and a second wing element 8. In FIG. 1 the second wing element 8 is behind the first wing element 7 and is covered up by said wing element 7.

The first and the second wing element 7, 8 are arranged downstream of the fixed element 6 and are hingeably attached to the fixed element 6 on an axis which extends so as to be essentially perpendicular to the direction of flight. In FIG. 1 the hingeing axis is shown in a dashed line. The fixed element 6 and the wing elements 7, 8 preferably extend in the direction of flight and are designed to be correspondingly aerodynamic.

Figure 2A:
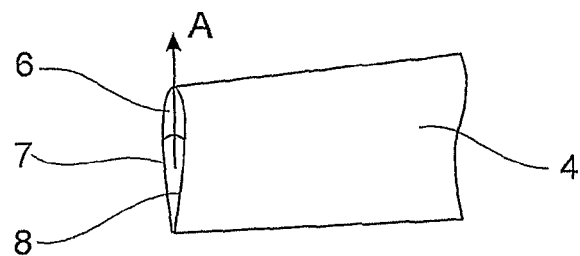
FIG. 2a-2d show diagrammatic top views of the system according to the first embodiment of the invention in various states.

FIG. 2a shows a top view of the system 1 according to FIG. 2 in a first state.

In this first state the first wing element 7 and the second wing element 8 are folded together, with their respective inner surfaces facing each other and preferably contacting each other lightly. The state 1 of the wing elements 7, 8 is for example present during normal flight. In this state, which is also referred to as the home position, the coefficient of resistance and the coefficient of lift are essentially at an aircraft-specific constant value.

As shown in FIG. 2a the fixed element 6 and the folded wing elements 7, 8 essentially extend in the direction of flight A, thus forming an aerodynamic unit.

Figure 2B:
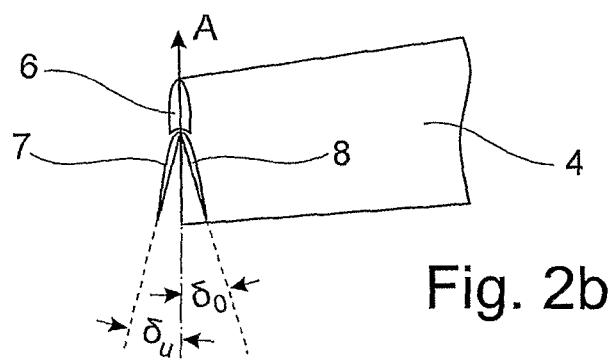

FIG. 2b shows a second state of the wing elements 7, 8. This second state exists for example at the beginning of the approach to land. In order to control the wing elements 7, 8 so that it assumes this second state it is for example possible to use the central control system of the aircraft.

As shown in FIG. 2b the first wing element 7 is deflected by an angle $\delta_u$ towards the outside, away from the fuselage (not shown). The second wing element 8 is deflected by an angle $\delta_o$ towards the inside towards the fuselage (not shown). The angles $\delta_u$, $\delta_o$ are relative in relation to the flight direction axis A. In this second state the coefficient of resistance increases while the coefficient of lift remains the same. As a consequence of the angle deflection $\delta_u$ and $\delta_o$ of the wing elements 7, 8 a constant change in the wing wake occurs. The size of the angle deflections $\delta_u$ and $\delta_o$ is aircraft-specific, with optimal values for example being determined in the wind tunnel.

Figure 2C:
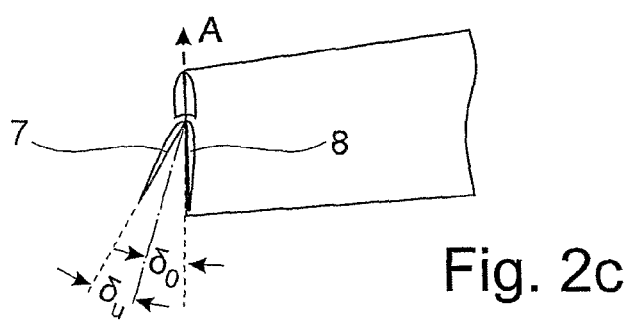

FIG. 2c shows a third state of the wing elements 7, 8, in which, from their middle position shown in FIG. 2b, the wing elements 7, 8, while maintaining their relative positions in relation to each other, are hinged outward into an outer end position. According to FIG. 2c the outer end position of the hingeing process is reached when the second wing element 8 essentially extends parallel to the flight direction axis A. The rotary movement of the wing elements 7, 8 into this outer end position takes place at a predetermined rotary speed. Control of this rotary movement can for example be assumed by the central aircraft control system.

Figure 2D:
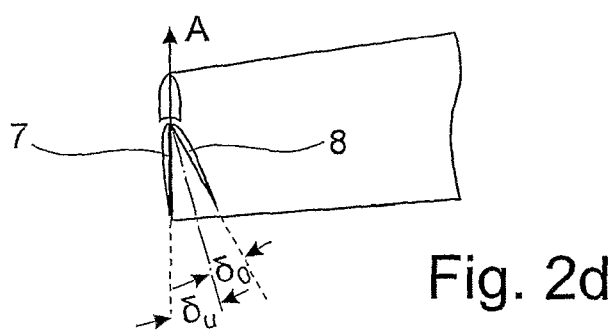

At the outer end position, as shown in FIG. 2c, the direction of rotation of the movement is changed and the wing elements 7, 8 are rotated to an inner end position, as shown in FIG. 2d. At this point the direction of rotation changes again and a new cycle commences.

During the movement sequence described above, from end position to end position, the deflection angles $\delta_u$, $\delta_o$ of the wing elements 7, 8 are preferably controlled such that the coefficient of resistance remains constant. As a result of this periodic movement sequence of the wing elements 7, 8 the continuous rolling action of the air in the region of the outer wing is disturbed, which leads to a reduction of the wake turbulence generated.

Figure 3:
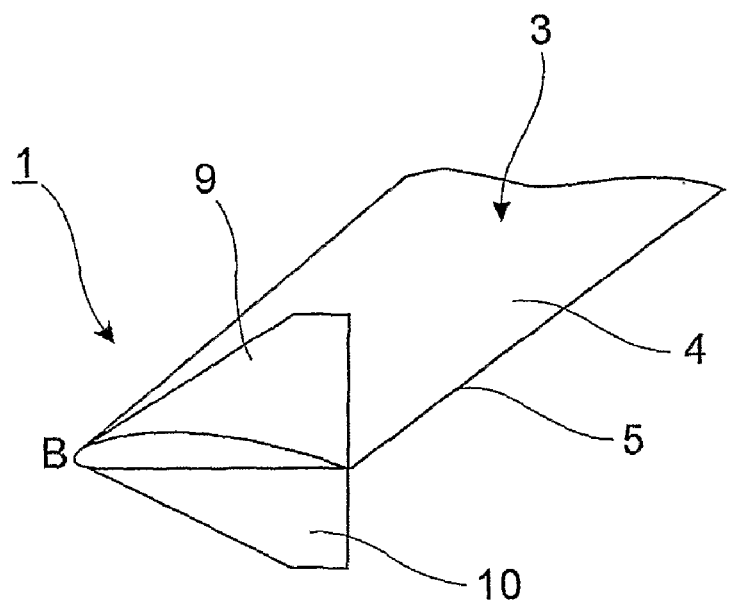
FIG. 3 shows a diagrammatic perspective partial view of a wing with a system according to a second embodiment of the invention.

FIG. 3 shows a second embodiment of the system 1 according to the invention in an arrangement as a so-called wing-tip fence.

According to this embodiment the system 1 according to the invention comprises a first wing element 9 and a second wing element 10, which are arranged on the outer extremity of an airfoil 3 of an aircraft (not shown). In particular, the first wing element 9 is arranged on the top 4 of the wing, while the second wing element 10 is arranged on the underside 5 of the wing. In a hinge point B, the wing elements 9, 10 are hingeable essentially perpendicular in relation to the direction of flight, as shown in FIG. 3a-3d.

Figure 3A:
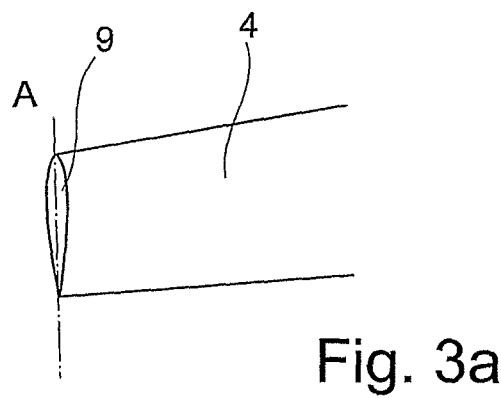
FIG. 3a-3d show diagrammatic top views of the system according to the second embodiment of the invention in various states.

FIG. 3a-3d provides top views of the top 4 of the wing of the system 1 shown in FIG. 3. As shown in FIG. 3a, in a way that is similar to the situation in the first embodiment, in a first state the wing elements 9, 10 are in a home position in which the wing elements 9, 10 are not deflected inward or outward relative to the flight direction axis A. In FIG. 3a the top view only shows the wing element 9, while the wing element 10 that is situated underneath it in the figure is covered up.

Figure 3B:
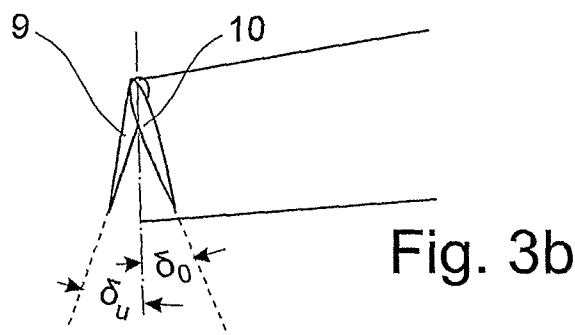

FIG. 3b shows the wing elements 9, 10, deflected by the deflection angle $\delta_u$, $\delta_o$ in a way that is similar to the situation in the first embodiment.

Figure 3C:
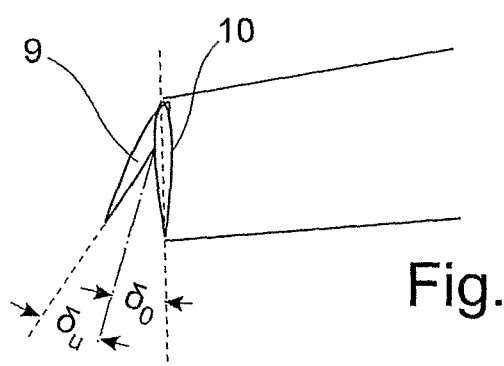

FIG. 3c shows a third state, in which the wing elements 9, 10 are hinged outward while maintaining their relative positions in relation to each other, in a way that is similar to the situation in the first embodiment.

Figure 3D:
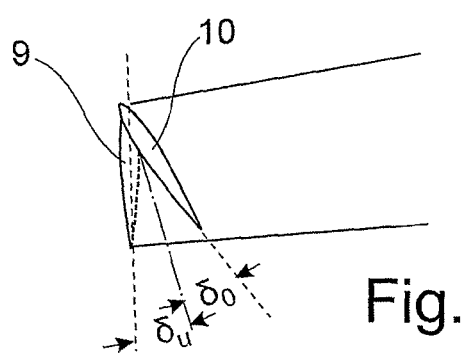

FIG. 3d shows the wing elements 9, 10 in a fourth state, in which they are hinged inwards. The aerodynamic processes in the states 1 to 4, as shown in FIG. 3a-3d, correspond to those according to the first embodiment, and are therefore not described again.

Although the invention has been described with reference to preferred embodiments, it goes without saying that the person skilled in the art can make changes in this field without leaving the scope of protection of the invention.

For example, more than two wing elements can be used and, while maintaining a predetermined relative position in relation to each other, can periodically be hinged at different speeds on a flight direction axis. Although according to the preferred embodiments it has in part been described that the states 3 and 4 are taken up while maintaining the relative positions of the wing elements, it is of course possible for the relative positions of the wing elements in relation to each other to change during the periodic rotary movement. A practically constant coefficient of resistance during the periodic rotary movement is a given requirement to the extent that passengers of the aircraft are not exposed to any noticeable acceleration forces or deceleration forces.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

REFERENCE LIST

1 System
2 Component
3 Airfoil or wing
4 Top of the wing
5 Bottom of the wing
6 Fixed element
7 First wing element
8 Second wing element
9 First wing element
10 Second wing element
A Flight direction axis
B Hinge point

What is claimed is:

1. A system for reducing wake turbulence of an aircraft during flight along a flight direction, the aircraft having a wing including an outer wing portion, an extremity and a top, the system comprising:
    a component configured to be attached to the top of the wing at the extremity of the wing of the aircraft so as to disturb a rolling action of air at the outer wing portion, the component comprising:
    a fixed element;
    a first hingeable wing element having a first inner surface and a second hingeable wing element having a second inner surface,
    wherein the first and second hingeable wing elements are configured to be hingedly positionable to a first position in which the first inner surface is positioned side-by-side with the second inner surface and downstream of the fixed element, and configured to be hingedly positionable to a second position in which the first and second hingeable elements are folded out relative to each other in the flight direction; and
    a central aircraft control system configured to control rotary movement of the first and second hingeable wing elements between an outer end position and an inner end position, such that in the outer end position the first wing element is folded outward at a first predetermined deflection angle in relation to an axis in the flight direction and the second wing element extends parallel to the flight direction, and such that in the inner end position the second wing element is folded inward at a second predetermined deflection angle in relation to the axis in the flight direction and the first wing element extends parallel to the flight direction.

2. The system of claim 1, wherein the first and second hingeable wing elements in the first position extend so as to be parallel to the flight direction, and in the second position the first hingeable wing element is folded outward at a first predetermined deflection angle in relation to an axis of the flight direction, and the second hingeable wing element is folded inward at a second predetermined deflection angle in relation to the axis of the flight direction.

3. The system of claim 2, wherein the first and second hingeable wing elements are configured such that hinging from time to time in the second position the first and second hingeable wing elements to and fro at a predetermined speed between the outer end position and the inner end position disturbs the rolling action of the air at the outer wing.

4. The system of claim 3, wherein during the hingeing in the second position, the first and the second deflection angle are such that a coefficient of resistance of the wing remains constant.

5. The system of claim 3, wherein the wing comprises a distal lateral edge, and in the outer end position the first hingeable wing element extends beyond the distal lateral edge of the wing when viewed from the top.

6. The system of claim 3, wherein an angle between the first hingeable wing element and the second hingeable wing element remains fixed during the hingeing in the second position.

7. The system of claim 1, wherein the wing comprises a distal lateral edge, and the component is positioned at the distal lateral edge of the wing.

8. The system of claim 1, wherein in the first position the first hingeable wing element and the second hingeable wing element are positioned directly posterior to the fixed element of the component in the flight direction.

9. The system of claim 1, wherein the first hingeable wing element comprises a leading edge and a trailing edge and the second hingeable wing element comprises a leading edge and a trailing edge, and wherein in the first position the first inner surface and the second inner surface are positioned along a first plane on an axis of the flight direction, and in the second position at least one of the trailing edge of the first hingeable wing element and the trailing edge of the second hingeable wing element is swung away from the first plane while the leading edge of the first hingeable wing element and the leading edge of the second hingeable wing element remain directly behind the fixed element of the component.

10. The system of claim 1, wherein the first hingeable wing element and the second hingeable wing element are hinged to the fixed element along a plane perpendicular to the flight direction.

11. The system of claim 1, wherein during the rotary movement a relative position of the first hingeable wing element is maintained in relation to the second hingeable wing element.

12. The system of claim 1, wherein during the rotary movement the central aircraft control system controls the deflection angles of the first and second hingeable wing elements such that a coefficient of resistance remains constant.

* * * * *

UNITED STATES PATENT AND TRADEMARK OFFICE
CERTIFICATE OF CORRECTION

| | |
|---|---|
| PATENT NO. | : 8,061,661 B2 |
| APPLICATION NO. | : 11/817852 |
| DATED | : November 22, 2011 |
| INVENTOR(S) | : May |

It is certified that error appears in the above-identified patent and that said Letters Patent is hereby corrected as shown below:

In Column 6, Line 49 the word "fro" should be replaced with "from"

Signed and Sealed this
Twenty-eighth Day of February, 2012

David J. Kappos
*Director of the United States Patent and Trademark Office*